United States Patent [19]

Matsuda et al.

[11] Patent Number: 4,904,438
[45] Date of Patent: Feb. 27, 1990

[54] DIACETYLENE-NYLON SALT COMPOUND AND METHOD FOR PRODUCTION OF TWO-DIMENSIONAL MACROMOLECULAR CRYSTALS AND SHAPED ARTICLES USING SAID COMPOUND

[75] Inventors: Hiro Matsuda; Hachiro Nakanishi; Masao Kato; Yoshio Tanaka, all of Ibaraki; Kazuo Nakayama, Ushiku, all of Japan

[73] Assignees: Agency of Industrial Science & Technology; Ministry of International Trade & Industry, both of Tokyo, Japan

[21] Appl. No.: 296,616

[22] Filed: Jan. 10, 1989

Related U.S. Application Data

[62] Division of Ser. No. 90,099, Aug. 27, 1987, Pat. No. 4,814,404.

[30] Foreign Application Priority Data

Sep. 4, 1986 [JP] Japan .................................. 61-208714
Sep. 4, 1986 [JP] Japan .................................. 61-208715
Mar. 9, 1987 [JP] Japan .................................. 62-53432

[51] Int. Cl.$^4$ .............................................. B29C 33/42
[52] U.S. Cl. ............................... 264/331.19; 522/176; 526/285; 528/345
[58] Field of Search .................... 528/345; 522/176; 526/285; 264/331.19

[56] References Cited

U.S. PATENT DOCUMENTS 4,225,550 9/1980 Karim et al. ................... 264/331.19

Primary Examiner—Joseph L. Schofer
Assistant Examiner—Alex H. Walker
Attorney, Agent, or Firm—Oblon, Spivak, McClelland, Maier & Neustadt

[57] ABSTRACT

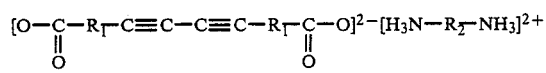

(wherein $R_1$ and $R_2$ independently stand for at least one member selected from the class consisting of alkylene groups, substituted alkylene groups, cycloalkylene groups, substituted cycloakylene groups, arylene groups, and substituted arylene groups), is a novel diacetylene-nylon salt compound possessing two kinds of ability of solid-state polymerization, and two-dimensional macromolecular crystals are obtained by severally polymerizing the diacetylene moiety and the nylon salt moiety of the compound. A shaped article of hig rigidity is produced by filling a mold with the aforementioned salt and subjecting the salt in the mold to simultaneous application of heat and pressure.

2 Claims, 1 Drawing Sheet

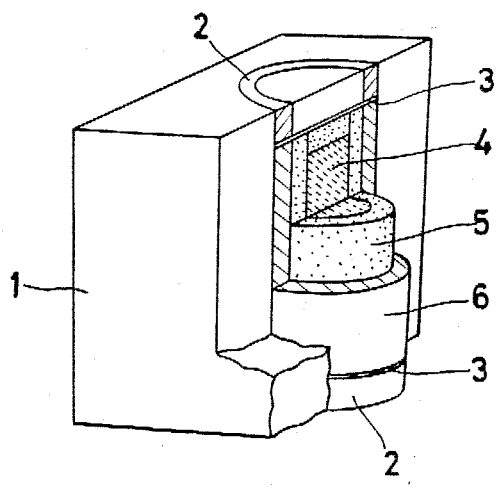

DIACETYLENE-NYLON SALT COMPOUND AND METHOD FOR PRODUCTION OF TWO-DIMENSIONAL MACROMOLECULAR CRYSTALS AND SHAPED ARTICLES USING SAID COMPOUND

This is a division of application Ser. No. 090,099 filed Aug. 27, 1987, now U.S. Pat. No. 4,814,404.

BACKGROUND OF THE INVENTION

This invention relates to a novel diacetylene-nylon salt compound, to a method for producing two-dimensional macromolecular crystals having covalent bond chains oriented and crystallized in two-dimensional directions by the solid-state polymerization of the diacetylene moiety and the solid-state polycondensation of the nylon salt moiety respectively of the aforementioned diacetylenenylon salt compound, and to a method for producing a shaped article of high rigidity by filling a mold with the aforementioned diacetylene-nylon salt compound and subjecting the compound in the mold to simultaneous application of heat and pressure.

In recent years, efforts have been devoted to the development of new materials in various fields. For example, research and development activities are being pursued in search of high-performance macromolecular materials possessing high strength and high modulus of elasticity and consequently expected to find extensive utility as heavy-duty materials of light weight and ready processibility capable of taking the place of metallic materials and inorganic materials.

Heretofore, as macromolecular materials enjoying high strength and high modulus of elasticity, whisker crystals of polyoxymethylene and fibrously oriented crystals of rigid macromolecules of polyarylamides such as, for example, the products of DuPont marketed under trademarks "Kevlar" and "Nomex" have found widespread acceptance. They range from several GPa's (gigapascal) to ten-odd GPa's in strength and from some tens of GPa's to about 100 GPa's in modulus of elasticity. For the purpose of conferring enhanced strength and modulus of elasticity upon these macromolecular materials, various studies are being continued in search of techniques capable of orienting and crystallizing these macromolecular materials. So far, for example, various techniques such as the superstretching method, the liquid crystal spinning method, the gel spinning method, the hot gel stretching method, and the carbonation method have been developed. None of these methods, however, is capable of producing perfect crystals. The macromolecular materials produced by these methods, therefore, are not necessarily fully satisfactory with respect to strength and modulus of elasticity.

It has been known that the diacetylene compounds represented by the formula:

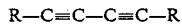

R—C≡C—C≡C—R when the substituents R are properly selected, exhibit an ability of solid-state polymerization which, upon excitation of the crystals thereof with heat, ultraviolet light, or γ ray, converts the compounds into macromolecular compounds with a conjugated main-chain. The macromolecular compounds obtained by this method, namely polydiacetylenes, are characterized by being perfect single crystals faithfully reflecting the crystalline arrangement of their respective monomer. It has been reported that such macromolecular compounds exhibit a modulus of elasticity approximating 60 GPa's in the direction in which their macromolecular chains are oriented ["Polymer", vol. 24, pp. 1023–1030, 1983].

Diamond is the strongest of the materials existing in the natural world. It has been theoretically demonstrated that in the design of molecular configuration for macromolecular materials possessing high strength and high modulus of elasticity, it is necessary to prepare single crystals which have small cross sections for occupation by molecules and possess polydimensional covalent bonds. Actually, however, no single crystal of the foregoing description has yet been discovered.

The highly oriented highly crystalline macromolecular compounds heretofore synthesized, molded, and processed for the purpose of obtaining materials of high strength invariably are one-dimensional chain macromolecular compounds. Though they exhibit fairly high levels of strength and modulus of elasticity in the direction of their molecular chains, they have a disadvantage that they are deficient in strength and modulus of elasticity in the direction perpendicular thereto. The polydiacetylenes obtained in the form of perfect single crystals as mentioned above have a disadvantage that they gain in brittleness as they are cleaved apart into fibers in the direction perpendicular to the direction of molecular chains, for example.

Among the heretofore known macromolecular compounds possessing polydimensional covalent bonds, there are counted those which are synthesized as by the intermolecular cross-linking method. By this method, it is extremely difficult to attain high crystallization of a compound. The method is barely capable of producing an amorphous reticular macromolecular compound.

As described above, no macromolecular material isotropically exhibiting high strength and high modulus of elasticity has yet been discovered. In the circumstance, the desirability of developing a macromolecular material of the foregoing description has found enthusiastic recognition.

An object of this invention is to provide a macromolecular material which isotropically exhibits high strength and high modulus of elasticity.

SUMMARY OF THE INVENTION

The inventors continued a study with a view to attaining the object described above. This study has led to the knowledge that the diacetylene-nylon salt compounds represented by the general formula:

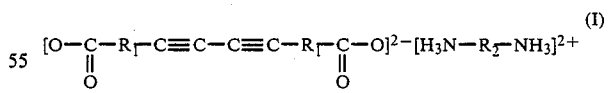

$$[O-\underset{\underset{O}{\|}}{C}-R_1-C\equiv C-C\equiv C-R_1-\underset{\underset{O}{\|}}{C}-O]^{2-}[H_3N-R_2-NH_3]^{2+} \quad (I)$$

(wherein $R_1$ and $R_2$ independently stand for at least one member selected from the class consisting of alkylene groups, substituted alkylene groups, cycloalkylene groups, substituted cycloalkylene groups, arylene groups, and substituted arylene groups), which are novel compounds to the art, possess an ability of solid-state polymerization which enables solid-state polymerization of the diacetylene moiety and solid-state polycondensation of the nylon salt moiety respectively of the compound to proceed in two different directions. They have further found that macromolecular crystals of a reticular structure possessing two-dimensional covalent bonds and a shaped article of high rigidity comprising two-dimensional macromolecular crystals are obtained from the diacetylene-nylon salt compound. The present invention has been perfected as the result.

BRIEF DESCRIPTION OF THE DRAWING

The accompanying drawing illustrates a typical apparatus to be used for the production of a shaped article of high rigidity of the present invention by thermal polymerization of a diacetylene-nylon salt compound of this invention under application of pressure.

DETAILED DESCRIPTION OF THE PREFERRED EMBODIMENTS

First, the diacetylene-nylon salt compounds represented by the aforementioned general formula (I) will be described.

In the general formula, $R_1$ and $R_2$, as already described, independently stand for at least one member selected from the class consisting of alkylene groups, substituted alkylene groups, cycloalkylene groups, substituted cycloalkylene groups, arylene groups, substituted arylene groups, and combinations thereof. For practical reasons, $R_1$ and $R_2$ preferably have no more than 20 carbon atoms. Examples of the substituents for those substituted groups mentioned above include halogens, cyano group, alkyl group, aryl group, nitro group, ether group, ester group, amide group, hydroxyl group, carbonyl group, and sulfonyl group.

One salient characteristic of these novel compounds resides in the fact that they permit production of two-dimensional macromolecular crystals having covalent bond chains oriented and crystallized in the directions of two dimensions because they possess two kinds of solid-state polymerization ability and they also permit production of a shaped article of high rigidity exhibiting high strength because they possess a reticular structure having covalent bonds extended two-dimensionally as well as high crystallinity.

The diacetylene-nylon salt compounds of the present invention come in various species possessing different substituents as $R_1$ and $R_2$. Of the compounds of the aforementioned general formula, those which serve as highly desirable raw materials for the production of the aforementioned two-dimensional macromolecular crystals and a shaped article of high rigidity and which are quite useful from the practical point of view will be described below.

| $R_1$ | $R_2$ | Melting Point (°C.) |
|---|---|---|
| $-(CH_2)_8-$ | $-(CH_2)_4-$ | 153–154 |
| " | $-(CH_2)_5-$ | 112–113 |
| " | $-(CH_2)_6-$ | 146–147 |
| " | $-(CH_2)_7-$ | 115–116 |
| " | $-(CH_2)_8-$ | 146–147 |
| " | $-(CH_2)_{12}-$ | 148–150 |
| " | $-\langle H \rangle-$ | 192–195 |
| " | $-H_2C-\langle\bigcirc\rangle-CH_2-$ | 186–187 |
| $-(CH_2)_3-$ | $-\langle H \rangle-$ | 228–230 |
| " | $-H_2C-\langle\bigcirc\rangle-CH_2-$ | 205–207 |
| $-(CH_2)_{18}-$ | $-(CH_2)_5-$ | 160–163 |
| " | $-(CH_2)_8-$ | 185–187 |
| " | $-\langle H \rangle-$ | 220–221 |
| $-\langle\bigcirc\rangle-$ | $-H_2C-\langle\bigcirc\rangle-CH_2-$ | — |

| R₁ | R₂ | Melting Point (°C.) |
|---|---|---|
| " | ![phenyl-O-phenyl] | — |
| ![phenyl-C(=O)-N(H)-CH₂-] | $-(CH_2)_6-$ | 186–189 |
| ![nitrophenyl ester group] | ![methylphenyl] | — |
| $-CH(Cl)-(CH_2)_2-$ | ![cyclohexyl-H] | 226–229 |
| " | $-H_2C-\bigcirc-CH_2-$ | 205–207 |
| ![phenyl-SO₂-phenyl-CH₂-] | ![tetrachloro-xylylene] | — |

Now, the method for synthesis of the diacetylene-nylon salt compound of this invention will be described below.

Crystals of a diacetylene-nylon salt compound are formed and precipitated when a diacetylene-dicarboxylic acid represented by the formula:

$$HO-\underset{\underset{O}{\|}}{C}-R_1-C\equiv C-C\equiv C-R_1-\underset{\underset{O}{\|}}{C}-OH \quad (II)$$

(wherein $R_1$ has the same meaning as defined above) and a diamine represented by the formula:

$$H_2N-R_2-NH_2 \quad (III)$$

(wherein $R_2$ has the same meaning as defined above) are mixed in equimolar amounts. The mixing of the diacetylene-dicarboxylic acid and the diamine can be effected by directly putting them together where they are both in a liquid state. Regardless of whether they are in a solid or liquid state, they can be mixed through the medium of an organic solvent such as, for example, methanol, ethanol, tetrahydrofuran, chloroform, ethyl acetate, or dimethyl formamide, so as to give rise to a solution containing them in a total concentration in the range of 1 m.mol/liter to 10 mols/liter. After this mixing, the resultant mixture begins to form a salt with evolution of heat and, immediately or within several hours thereafter, induces precipitation of crystals of the diacetylene-nylon salt. Where the precipitation of the crystals is not obtained by merely mixing the two compounds, it can be induced by either heating the resultant mixture to a temperature near the boiling point of the solvent or concentrating the resultant mixture. The precipitated crystals may be directly separated by filtration and dried. Alternatively, they may be recrystallized from a mixed solvent of ethanol with 10 to 30% by weight of water.

The diacetylene dicarboxylic acid is synthesized by subjecting an acetylene carboxylic acid derivative represented by the general formula:

$$HO-\underset{\underset{O}{\|}}{C}-R_1-C\equiv C-H$$

(wherein $R_1$ has the same meaning as defined above) to oxidative coupling in the presence of a catalyst composed of copper ion and tetramethylethylene diamine. Otherwise, it may be synthesized by oxidizing diacetylene diol represented by the general formula:

$$HO-CH_2-R_1-C\equiv C-C\equiv C-R_1-CH_2-OH$$

(wherein $R_1$ has the same meaning as defined above) with a solution composed of chromium trioxide and aqueous sulfuric acid solution.

The diamine derivative to be used in this invention is a compound generally available on the market.

Now, the method for producing two-dimensional macromolecular crystals from the diacetylene-nylon salt compound of the present invention will be described below.

The diacetylene-nylon salt compound, as already described, possesses two kinds of ability of solid-state polymerization. The two-dimensional macromolecular crystals aimed at, therefore, can be produced by first subjecting the diacetylene moiety of the compound to solid-state polymerization and then subjecting the nylon salt moiety thereof to solid-state polycondensation or by first subjecting the nylon salt moiety thereof to solid-state polycondensation and then subjecting the diacetylene moiety thereof to solid-state polymerization.

The aforementioned macromolecular crystals which are produced as described above are two-dimensional macromolecular crystals of a reticular structure wherein conjugated rigid polydiacetylene chains and nylon chains having an amide bond forming a hydrogen bond are perfectly oriented in their respective directions and they are bound with covalent bonds. They possess high strength and, therefore, are useful as a high-performance macromolecular material.

Now, the method of production will be described. The solid-state polymerization of the diacetylene moiety of the diacetylene-nylon salt compound is effected by placing the compound in a vacuum sealed tube and irradiating it with cobalt 60 gamma rays to a dosage of some tens of MRads to some hundreds of MRads, or by dispersing the compound in a solvent such as methanol or chloroform which is incapable of dissolving the compound and irradiating the resultant dispersion with ultraviolet rays for several hours to some hundreds of hours, or by maintaining the compound at a temperature not exceeding the melting point of the compound for several days. The solid-state polycondensation of the nylon salt moiety of the diacetylene-nylon salt compound is effected by placing the compound in a vacuum sealed tube, in a vacuum deaerated system, or in a pressure system such as an autoclave or other similar pressure vessel and maintaining it at a temperature several degrees to some tens of degrees in Centigrade lower, preferably 50 °C. to 5 °C. lower, than the melting point thereof for several hours to some tens of hours.

Since the two-dimensional macromolecular crystals obtained as described above possess high strength and high modulus of elasticity, the shaped article cannot be easily produced from the crystals.

The method for easy production of the shaped article of high rigidity from the diacetylene-nylon salt compound of the present invention as a raw material will be described.

To be specific, the shaped article of high rigidity aimed at can be easily obtained by filling a mold of a desired shape with a diacetylene-nylon salt compound represented by the aforementioned general formula (I) and subjecting the compound in the mold to thermal polymerization under a pressure in the range of $0.5 \times 10^4$ to $15 \times 10^4$ atmospheres at a temperature in the range of 100° to 400° C.

The method for application of the pressure is not specifically restricted except for the sole requirement that it should be capable of producing a condition for isotropic application of pressure. Any method fulfilling this requirement can be adopted. For example, a method which, as illustrated in the accompanying drawing, comprises filling a mold using pyroferrite as a pressure medium with the diacetylene-nylon salt compound and applying pressure to the compound in the mold within a link type cube-incorporated anvil device may be adopted advantageously. The drawing is a perspective cross section illustrating a typical configuration in which a mold using pyroferrite 1 as a pressure medium is filled with a diacetylene-nylon salt compound 4. In this diagram, 2 stands for a current ring made of nickel, 3 for a molybdenum plate, 5 for a test tube made of Teflon and filled with the diacetylene-nylon salt compound 4, and 6 for a carbon heater adapted to apply heat to the test tube.

The pressure to be used in the method of the present invention is selected in the range of $0.5 \times 10^4$ to $15 \times 10^4$ atmospheres. If this pressure is less than $0.5 \times 10^4$ atmospheres, the shaped article with high rigidity aimed at by this invention cannot be obtained. If the pressure exceeds $15 \times 10^4$ atmospheres, the excess of pressure is unnecessary and jeopardizes the economy of the production.

The method for application of heat is not specifically restricted except for the sole requirement that it should be capable of retaining the reaction system at a prescribed temperature for a stated length of time. A method which, as illustrated in the accompanying drawing, effects the heating of the reaction system by feeding a prescribed electric current to the carbon heater 6 constructed as shown in the diagram may be adopted. The temperature for the polymerization in the method of this invention is selected in the range of 100° to 400° C. If this temperature is less than 100° C., the reaction velocity is too low for the method itself to be practicable. If the temperature exceeds the upper limit of the range, there is a possibility of the shaped article being degraded.

As to the reaction time, it is generally sufficient roughly in the range of 20 to 180 minutes, though it is affected by the kind of the raw material and the magnitudes of pressure and temperature. As regards the shape of the molded product, this product can be obtained in any desired shape by suitably designing the mold to be used therefor.

The shaped article obtained as described above is a highly crystalline produce of a reticular structure possessing two-dimensional covalent bonds. It is characterized by possessing high strength, high modulus of elasticity, and extremely high rigidity. The method of this invention, for example, is capable of producing a shaped article having rigidity Hv, in the range of 60 to 300 kg/mm² as measured with a Vickers microhardness tester. The Vickers hardness is about three times the yield stress and constitutes a function of the modulus of elasticity. The rigidity of the shaped article is so high as to compare favorably with that of copper (Hv=95), iron (Hv=130), or platinum (Hv=150).

Owing to these outstanding attributes, therefore, the shaped article is highly suitable as a light weight structural material for space vehicles and aircraft, a structural material for precision machinery and a material for electronic circuit substrate, for example.

Now, the present invention will be described more specifically below with reference to working examples.

EXAMPLE 1

3.62 g of diacetylene dicarboxylic acid represented by the formula:

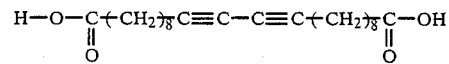

and 1.02 g of pentamethylene diamine were respectively dissolved in 30 ml of ethanol. Then, the resultant solutions were mixed. The mixed solution evolved heat. When this solution was left standing for three hours, white needle crystals were precipitated therein. The crystals were separated by filtration and dried to produce 4.5 g of diacetylene-nylon salt. This product had $-(CH_2)_8-$ as $R_1$ and $-(CH_2)_5-$ as $R_2$ in the aforementioned general formula (I). The melting point of this product was 112° to 113° C.

Elementary analyses for $C_{27}H_{48}N_2O_4$. Calculated (%): C 69.79, H 10.41, N 6.03. Found (%): C 69.20, H 10.27, N 6.01.

EXAMPLE 2

In 50 ml of chloroform, 3.62 g of the diacetylene dicarboxylic acid indicated in Example 1 was dissolved. When the resultant solution was mixed with 1.14 g of 1,4-C diaminocyclohexane, the resultant mixed solution immediately precipitated white granular crystals with evolution of heat. The crystals were separated by filtration and dried to produce 4.7 g of diacetylene-nylon salt. This product had $-(CH_2)_8-$ as $R_1$ and

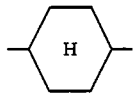

as $R_2$ in the aforementioned general formula (I). When this product was recrystallized from a mixed solvent consisting of ethanol and 20% by weight of water, there were obtained white plate crystals. The melting point of the crystals was 192° to 195° C.

Elementary analyses for $C_{26}H_{48}N_2O_4$. Calculated (%): C 68.99, H 10.69, N 6.19. Found (%): C 68.20, H 10.54, N 6.08.

EXAMPLE 3

In 30 ml of ethanol, 3.62 g of diacetylene dicarboxylic acid used in Example 1 was dissolved. When 1 ml of tetramethylene diamine was added dropwise to the resultant solution, the mixed solution started evolution of heat. After five hours' evolution of heat, the mixed solution precipitated white needle crystals. When the crystals were separated by filtration and dried, there was obtained 4.2 g of diacetylene-nylon salt which had $-(CH_2)_8-$ as $R_1$ and $-(CH_2)_4-$ as $R_2$ in the aforementioned general formula (I). The melting point of this product was 153° to 154° C.

Elementary analyses for $C_{26}H_{46}N_2O_4$. Calculated (%): C 69.29, H 10.29, N 6.22. Found (%): C 69.10, H 10.35, N 6.20.

EXAMPLE 4

2.91 g of diacetylene dicarboxylic acid represented by the formula:

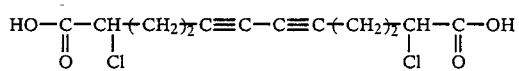

and 1.36 g of xylylene diamine were respectively dissolved in 30 ml of tetrahydrofuran. When the resultant solutions were mixed, there ensued evolution of heat. When the mixed solution was left standing for about one to three hours, it precipitated white granular crystals. The crystals were separated by filtration and dried to produce 4.1 g of diacetylene-nylon salt. This product had $CH-CH_2-_2$ as $R_1$ and

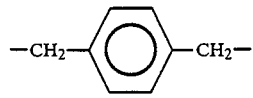

as $R_2$ in the aforementioned general formula (I). The melting point of this product was 205° to 207° C.

Elementary analyses for $C_{20}H_{24}O_4N_2Cl_2$. Calculated (%): C 56.21, H 5.66, N 6.56. Found (%): C 55.85, H 5.43, N 6.60.

EXAMPLE 5

2.9 g of diacetylene dicarboxylic acid represented by the formula:

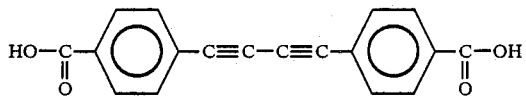

and 2.0 g of 4,4'-diaminodiphenyl ether were respectively dissolved in 10 ml of ethanol. Then, the resultant solutions were mixed and refluxed at the boiling point for 10 hours. During the reflux, the mixed solution gradually precipitated light red crystals. The crystals were separated by filtration and dried to produce 0.5 g of salt. This product had

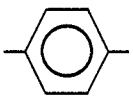

as $R_1$ and

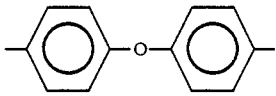

as $R_2$ in the aforementioned general formula (I). The product showed no melting point and underwent decomposition in the neighborhood of 300° to 350° C.

Elementary analyses for $C_{30}H_{22}N_2O_5$. Calculated (%): C 73.46, H 4.52, N 5.71. Found (%): C 73.10, H 4.48, N 5.59.

EXAMPLE 6

2.02 g of diacetylene dicarboxylic acid represented by the formula:

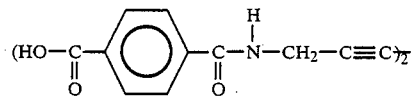

and 0.58 g of hexamethylene diamine were respectively dissolved in 20 ml of ethanol When the resultant solutions were mixed, the produced mixed solution evolved heat. When this mixed solution was left standing for one to two hours, it precipitated while crystals. The crystals were separated by filtration and dried to produce 2.3 g of diacetylene-nylon salt. This product had

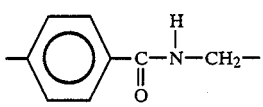

as $R_1$ and $-(CH_2)_6-$ as $R_2$ in the aforementioned general formula (I). The melting point of this product was 186° to 189° C.

Elementary analyses for $C_{28}H_{32}N_4O_6$. Calculated (%): C 64.60, H 6.20, N 10.76. Found (%): C 64.69, H 6.15, N 10.54.

EXAMPLE 7

When 6.0 g of diacetylene dicarboxylic acid represented by the formula:

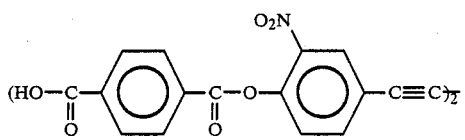

1.22 g of 2-methyl-p-phenylene diamine were mixed, dissolved in 30 ml of dimethyl formamide, and heated at about 130° C. for three hours, the mixed solution precipitated light blue crystals The crystals were separated by filtration and dried to produce 5.5 g of diacetylene-nylon salt. This product had

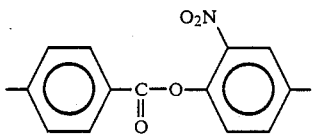

as $R_1$ and

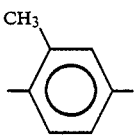

as $R_2$ in the aforementioned general formula (I). This product showed no melting point and underwent decomposition at temperatures of 300° to 350° C.

Elementary analyses for $C_{39}H_{26}N_4O_8$. Calculated (%): C 69.02, H 3.86, N 8.26. Found (%): C 68.95, H 3.94, N 8.22.

EXAMPLE 8

6.43 g of diacetylene dicarboxylic acid represented by the formula:

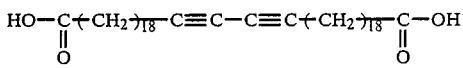

and 1.02 g of pentamethylene diamine were respectively dissolved in 50 ml of chloroform. When the resultant solutions were mixed, the mixed solution precipitated white powdery crystals with evolution of heat. When the crystals were separated by filtration and dried, there was obtained 7.3 g of diacetylene-nylon salt which had $-(CH_2{-}13\rightarrow)_{18}$ as $R_1$ and $-(CH_2)_5-$ as $R_2$ in the aforementioned general formula (I). The melting point of this product was 160° to 3° C.

Elementary analyses for $C_{47}H_{88}N_2O_4$. Calculated (%): C 75.75, H 11.90, N 3.76. Found (%): C 75.70, H 11.98, N 3.71.

EXAMPLE 9

When a diacetylene-nylon salt compound represented by the formula:

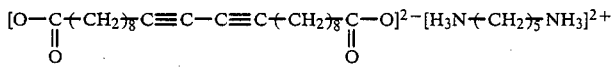

was vacuum sealed in a tube and irradiated with 50 MRads of cobalt 60 gamma rays, the diacetylene moiety of the compound underwent solid-state polymerization to produce blackish blue polydiacetylene crystals. When the crystals were heated at 120° C. for 24 hours under vacuum deaeration, they turned red. Consequently, the infrared carboxyl absorption band shifted from 1,550 cm$^{31\ 1}$ to 1,630 cm$^{31\ 1}$ an amide I absorption band appeared, and a polyamide chain was formed. By observation of a sample of the crystals under a scanning electron microscope, the red crystals were found to retain the same shape and size of the initial diacetylene-nylon salt. From the powder X-ray diffraction pattern, the crystals were identified to be two-dimensional macromolecular crystals recognized to possess high crystallinity.

EXAMPLE 10

When a diacetylene-nylon salt represented by the formula:

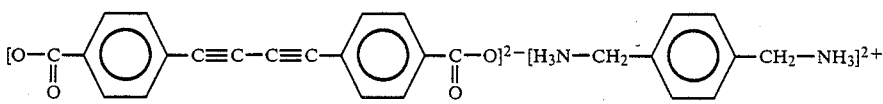

was heated under 2 atmospheres of nitrogen gas at 150° C. for 10 hours, there were formed light blue polyamide crystals. When the crystals were placed in a vacuum sealed tube and irradiated with 100 MRads of cobalt 60 gamma rays, they turned black with formation of a polydiacetylene conjugate chain to give rise to two-dimensional macromolecular crystals similar in shape to the diacetylene-nylon salt compound crystals used as the starting material.

EXAMPLE 11

A diacetylene-nylon salt represented by the formula:

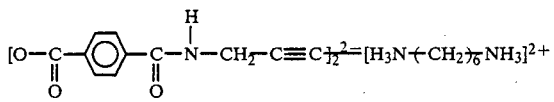

was dispersed in benzene and stirred and irradiated with the light from a high-pressure mercury-vapor lamp (100 W) for 10 hours. As a result, the salt turned dark blue to induce solid-state polymerization of diacetylene and consequent formation of polydiacetylene crystals. When the crystals were vacuum sealed in a pressure tube and heated at 180° C. for 50 hours, there ensued solid-state polycondensation and consequent formation of a polyamide chain. There was formed a two-dimensional macromolecular compound having a polydiacetylene chain and a polyamide chain linked with a covalent bond. From the powder X-ray diffraction pattern of a sample of this compound, the compound was found to be highly crystalline. By observation under an optical microscope, this product was identified to be two-dimensional macromolecular crystals similar in shape to the diacetylene-nylon salt compound as the starting material.

EXAMPLE 12

When a diacetylene-nylon salt compound represented by the formula:

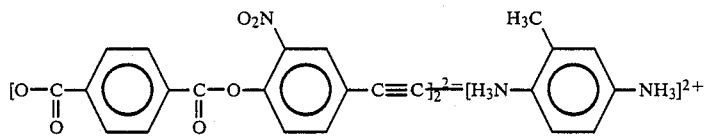

was subjected to solid-state polycondensation and solid-state polymerization by following the procedure of Example 10, there were produced dark red two-dimensional macromolecular crystals.

EXAMPLE 13

When a diacetylene-nylon salt compound represented by the formula:

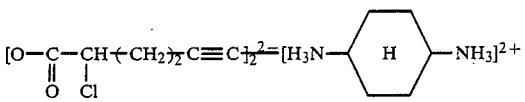

was subjected to solid-state polymerization and solid-state polycondensation by following the procedure of Example 9, there were produced reddish brown two-dimensional macromolecular crystals.

EXAMPLE 14

When a diacetylene-nylon salt compound represented by the formula:

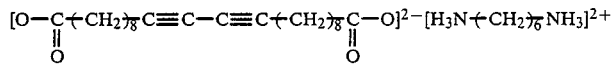

was subjected to solid-state polymerization and solid-state polycondensation by following the procedure of Example 9, there were formed dark red two-dimensional macromolecular crystals.

EXAMPLE 15

When a diacetylene-nylon salt compound represented by the formula:

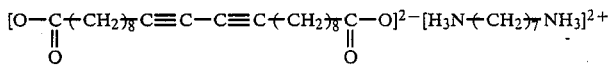

was heated at 110° C. under one atmosphere of nitrogen gas for 48 hours, there were formed light red polyamide crystals. When the crystals were placed in a vacuum sealed tube and irradiated with 50 MRads of cobalt-60 gamma rays, they turned purple with formation of conjugate chains of polydiacetylene. Consequently, there were produced two-dimensional macromolecular crystals similar in shape to the crystals of diacetylene-nylon salt compound used as the starting material.

EXAMPLE 16

When a diacetylene-nylon salt represented by the formula:

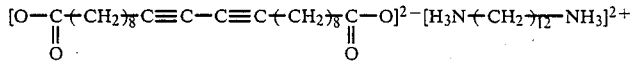

was dispersed in hexane and stirred and, at the same time, irradiated with the light from a low-pressure mercury-vapor lamp for three hours, the dispersion turned dark blue with solid-state polymerization of the diacetylene moiety of the compound. Consequently, there were produced polydiacetylene crystals. When these crystals were heated at 150° C. under five atmospheres of nitrogen gas for 24 hours, they underwent solid-state polycondensation with formation of polyamide. As a result, there were produced dark red two-dimensional macromolecular crystals.

EXAMPLE 17

When a diacetylene-nylon salt compound represented by the formula:

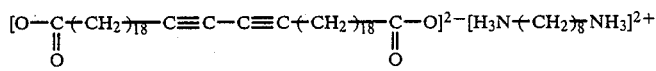

was subjected to solid-state polycondensation and solid-state polymerization by following the procedure of Example 10, there were obtained orange two-dimensional macromolecular crystals.

EXAMPLE 18

In an apparatus constructed as illustrated in the drawing, a diacetylene-nylon salt compound represented by the formula:

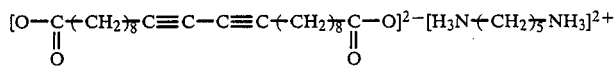

was packed in a mold and left reacting at 230° C. for 20 minutes under application of 50,000 atmospheres within a link type anvil device, with electric current fed to a carbon heater built in the mold.

At the end of the reaction, the product was removed from the mold. This was a cylindrical article about 3 mm in diameter and 3 mm in length. Since this article assumed a reddish black color, it was recognized to have undergone solid-state polymerization of the diacetylene moiety of the compound. Since the infrared carbonyl absorption band had shifted from 1,550 cm$^{-1}$ to 1,630 cm$^{-1}$, it was recognized to have further undergone solid-state polycondensation of the nylon salt moiety and consequently formed a polyamide. From the X-ray diffraction pattern of a sample of the product, this product was found to be a shaped article formed of two-dimensional macromolecular crystals having a face interval of 4.2 Å. The Vickers hardness, Hv, of the shaped article was about 100 kg/mm$^2$.

EXAMPLE 19

In an apparatus constructed as illustrated in the accompanying drawing, a diacetylene-nylon salt compound represented by the formula:

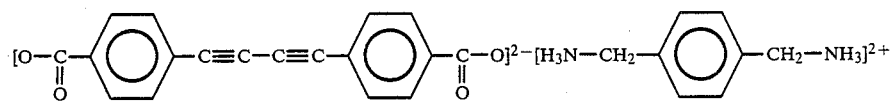

was packed in a mold and left reacting at 300° C. for 30 minutes under application of 30,000 atmospheres within a link type anvil device, with electric current fed to a carbon heater built in the mold.

At the end of the reaction, the product was removed from the mold. This was a cylindrical article about 3 mm in diameter and 2 mm in length. By the same analysis as in Example 18, the product was recognized to be a shaped article of two-dimensional macromolecular crystals. The Vickers hardness of the article was about 230 kg/mm$^2$.

EXAMPLE 20

In an apparatus constructed as illustrated in the accompanying drawing, a diacetylene-nylon salt compound represented by the formula:

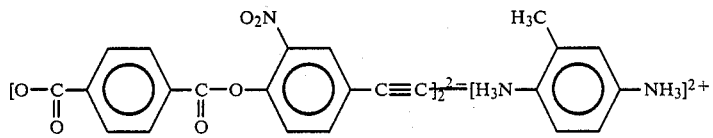

was packed in a mold and left reacting at 350° C. for 20 minutes under application of 80,000 atmospheres within a link type anvil device, with electric current fed to a carbon heater built in the mold. Consequently, there was obtained a shaped article of two-dimensional macromolecular crystals similar in shape to those of Example 18. The Vickers hardness, Hv, of this article was about 300 kg/mm$^2$.

EXAMPLE 21

In an apparatus constructed as illustrated in the accompanying drawing, a diacetylene-nylon salt compound represented by the formula:

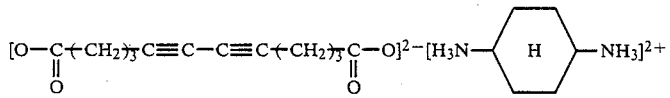

was packed in a mold and left reacting at 120° C. for 120 minutes under application of 100,000 atmospheres within a link type anvil device, with electric current fed to a carbon heater built in the mold. Consequently, there was obtained a shaped article of two-dimensional macromolecular crystals similar in shape to those of Example 18. The Vickers hardness, Hv, of this article was 130 kg/mm².

EXAMPLE 22

In an apparatus constructed as illustrated in the accompanying drawing, a diacetylene-nylon salt compound represented by the formula:

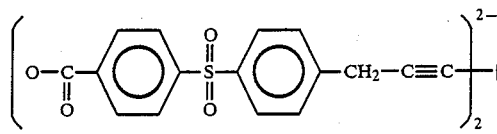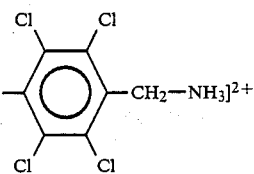

was packed in a mold and left reacting at 350° C. for 30 minutes under application of 10,000 atmospheres within a link type anvil device, with electric current fed to a carbon heater built in the mold. As a result, there was obtained a shaped article of two-dimensional macromolecular crystals similar in shape to those of Example 18. The Vickers hardness, Hv, of this article was 180 kg/mm₂.

EXAMPLE 23

In an apparatus constructed as illustrated in the accompanying drawing, a diacetylene-nylon salt compound represented by the formula:

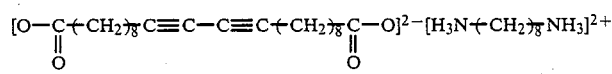

was placed in a mold and left reacting at 300° C. for 20 minutes under application of 50,000 atmospheres within a link type anvil device, with electric current supplied to a carbon heater built in the mold.

At the end of the reaction, there was obtained a shaped article of two-dimensional macromolecular crystals similar to those of Example 18. The Vickers hardness, Hv, of this shaped article was 60 kg/mm².

EXAMPLE 24

In an apparatus constructed as illustrated in the accompanying drawing, a diacetylene-nylon salt compound represented by the formula:

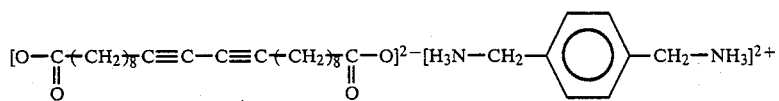

was placed in a mold and left reacting at 250° C. for 30 minutes under application of 120,000 atmospheres within a link type anvil device, with electric current supplied to a carbon heater built in the mold.

At the end of the reaction, the mold was opened to remove the product. This was a cylindrical shaped article about 2.3 mm in diameter and 4 mm in length. By the same test as in Example 18, it was found to be formed of two-dimensional macromolecular crystals. The Vickers hardness of this shaped article was about 150 kg/mm².

EXAMPLE 25

In an apparatus constructed as illustrated in the accompanying drawing, a diacetylene-nylon salt compound represented by the formula:

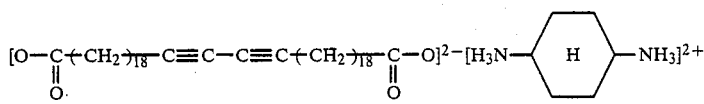

was placed in a mold and left reacting at 220° C. for 60 minutes under application of 50,000 atmospheres within a link type anvil device, with electric current supplied to a carbon heater built in the mold.

At the end of the reaction, there was obtained a shaped article formed of two-dimensional macromolecular crystals similar to those of Example 18. The Vickers hardness, Hv, of the article was about 80 kg/mm².

EXAMPLE 26

A diacetylene-nylon salt compound represented by the formula:

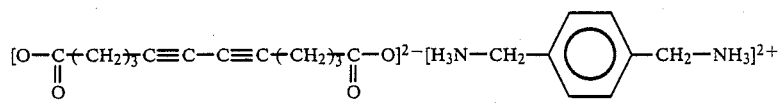

was placed in a piston type high-pressure vessel, pressed under application of 9000 atmospheres with a tensile tester (Tensilon), and then left reacting at 220° C. for 180 minutes, with electric current supplied to a Nichrome wire wound round the periphery of the piston type high-pressure vessel.

At the end of the reaction, the vessel was opened to obtain a cylindrical shaped article 7.5 mm in diameter and 12 mm in length. By the same test as in Example 18, it was found to be formed of two-dimensional macromolecular crystals. The Vickers hardness of this article was about 75 kg/mm².

What is claimed is:

1. A method for the production of a shaped article of high rigidity, which method comprises packing a diacetylene-nylon salt compound represented by the general formula:

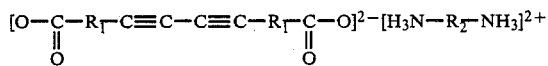

wherein $R_1$ and $R_2$ independently stand for at least one member selected from the class consisting of alkylene groups, substituted alkylene groups, cycloalkylene groups, substituted cycloalkylene groups, arylene groups, and substituted arylene groups, in a mold of a desired shape and then thermally polymerizing said compound in said mold at a temperature in the range of 100° to 400° C. under a pressure in the range of $0.5 \times 10^4$ to $15 \times 10^4$ atmospheres.

2. The method according to claim 1, wherein each of said substituents is at least one member selected from the class consisting of halogens, cyano group, alkyl group, aryl group, nitro group, ether group, ester group, amide group, hydroxy group, carbonyl group, and sulfonyl group.

* * * * *